(12) United States Patent
Ghoneim

(10) Patent No.: US 8,634,986 B2
(45) Date of Patent: Jan. 21, 2014

(54) FRICTION-BASED STATE OF HEALTH INDICATOR FOR AN ELECTRIC POWER STEERING SYSTEM

(75) Inventor: Youssef A. Ghoneim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 379 days.

(21) Appl. No.: 13/075,263

(22) Filed: Mar. 30, 2011

(65) Prior Publication Data

US 2012/0253588 A1 Oct. 4, 2012

(51) Int. Cl.
*B62D 6/00* (2006.01)

(52) U.S. Cl.
USPC ........................................ 701/32.9; 701/34.4

(58) Field of Classification Search
USPC ............. 701/32.9, 34.4, 41, 42, 80; 73/146.5, 73/862.325
See application file for complete search history.

(56) References Cited

U.S. PATENT DOCUMENTS

| | | | |
|---|---|---|---|
| 2006/0169523 A1* | 8/2006 | Yoneda et al. ................. | 180/421 |
| 2008/0059134 A1* | 3/2008 | Miyashita et al. ................ | 703/8 |
| 2008/0228411 A1* | 9/2008 | Miyashita et al. ............... | 702/34 |
| 2008/0294313 A1* | 11/2008 | Aoki et al. ........................ | 701/43 |
| 2009/0192679 A1* | 7/2009 | Kobayashi et al. .............. | 701/42 |
| 2010/0077847 A1* | 4/2010 | Joe et al. ........................... | 73/146 |
| 2010/0228441 A1* | 9/2010 | Watanabe et al. ................ | 701/41 |
| 2011/0202239 A1* | 8/2011 | Maruyama et al. .............. | 701/41 |
| 2011/0204889 A1* | 8/2011 | Nomura ........................ | 324/252 |

FOREIGN PATENT DOCUMENTS

| | | |
|---|---|---|
| DE | 10206474 A1 | 8/2003 |
| DE | 10337086 A1 | 3/2004 |
| DE | 102006017775 A1 | 10/2007 |
| DE | 102009002245 A1 | 10/2010 |

* cited by examiner

*Primary Examiner* — Marthe Marc-Coleman
(74) *Attorney, Agent, or Firm* — Quinn Law Group, PLLC

(57) ABSTRACT

A method for determining a state of health (SOH) value for an electric power steering (EPS) system in a vehicle includes estimating a first Self-Aligning Torque (SAT) value using a tire dynamics model, which includes modeled dynamics in the linear region of a lateral force acting on the vehicle tires. The method also includes estimating a second SAT value using an extended state observer and nominal parameters for the EPS system, and calculating a variance between the first and second SAT values. The controller monitors a progression of the calculated variance over a calibrated interval using the controller to thereby determine the SOH value, and automatically executes a control action using the SOH value. An EPS system for a vehicle includes a steering wheel, torque and angle sensors, a rack and pinion assembly, a steering motor, and the controller. A vehicle is also disclosed having the same controller.

12 Claims, 2 Drawing Sheets

US 8,634,986 B2

FRICTION-BASED STATE OF HEALTH INDICATOR FOR AN ELECTRIC POWER STEERING SYSTEM

TECHNICAL FIELD

The present disclosure relates to a system and method for determining the state of health of an electric power steering system.

BACKGROUND

Electric power steering (EPS) is a direct replacement for hydraulic power steering, but consumes significantly less energy during operation. Hydraulic power steering uses a mechanical torque sensor to measure the torque applied to a steering wheel by a driver. The torque sensor is coupled to a valve, which in turn directs hydraulic fluid so as to amplify the applied torque. EPS works in a similar manner, however an electronic torque sensor is used to measure the steering wheel torque, and an electric motor is used to apply additional torque to the steering rack. Failure of either system can make the vehicle relatively difficult to steer.

EPS capability may be especially attractive when used aboard a hybrid vehicle having an internal combustion engine and one or more electric traction motors. Hybrid vehicles typically run in an electric vehicle (EV) mode up to a threshold vehicle speed. The engine is off in the EV mode(s). Therefore, mechanical power which is ordinarily provided by engine torque is discontinued, which precludes the use of a conventional hydraulic power steering system using an engine-driven fluid pump.

SUMMARY

A method is disclosed herein for determining a state of health (SOH) value for a steering column-mounted electric power steering (EPS) system in a vehicle having tires and a controller. Execution of the present method using the onboard controller ultimately determines an SOH value for the EPS system by estimating a first self-aligning torque (SAT) value using a tire dynamics model. The tire dynamics model includes modeled dynamics in the linear region of the lateral force acting on the tires of the vehicle during a steering maneuver. The method includes estimating a second SAT value using an extended state observer of the controller and nominal parameters for the EPS system, and then calculating a variance between the first and second SAT values. The trend or progression of the calculated variance is monitored over a calibrated interval using the controller to thereby determine the SOH value. The method includes automatically executing a suitable control action using the SOH value.

An EPS system for a vehicle includes a steering wheel, torque sensor, angle sensor, rack and pinion assembly, a steering motor which passes a variable motor assist torque to the rack and pinion assembly at a torque level which depends in part on the steering angle and steering torque from the respective steering angle and torque sensors, and a controller having an extended state observer. The controller is configured for executing the above method.

The above features and advantages, and other features and advantages of the present invention are readily apparent from the following detailed description of the best modes for carrying out the invention when taken in connection with the accompanying drawings.

DETAILED DESCRIPTION

Figure 1:
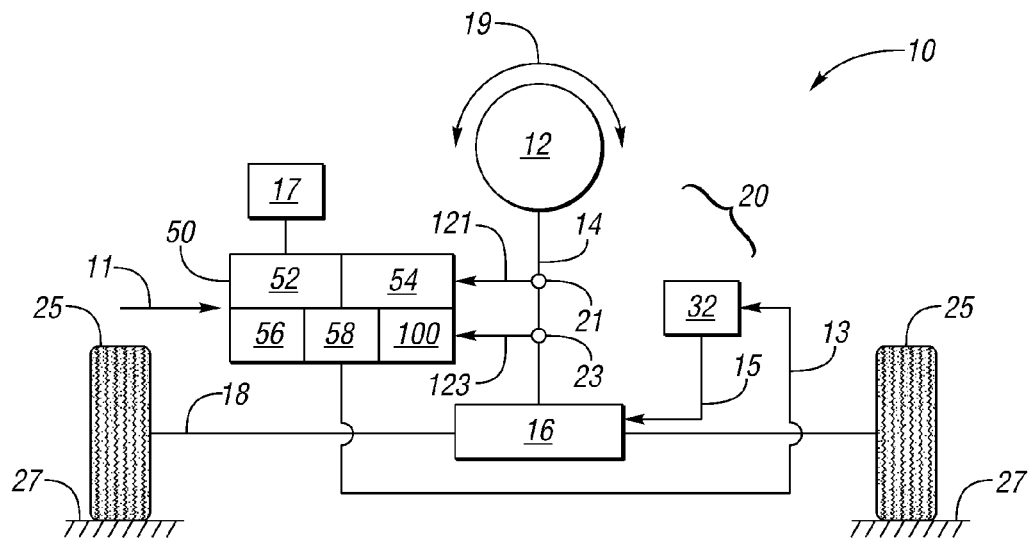
FIG. 1 is a schematic illustration of a vehicle having a steering column-mounted electric power steering (EPS) system and a controller configured for determining a state of health (SOH) value of the EPS system.

Referring to the drawings, wherein like reference numbers correspond to like or similar components throughout the several figures, and beginning with FIG. 1, a vehicle 10 includes a steering column-mounted electric power steering (EPS) system 20 and a controller 50. The controller 50 is shown schematically as a single unit, however the various elements of the controller 50 may be distributed among multiple special purpose controllers or electronic control units (ECUs), e.g., a motor control unit, a steering control unit, etc.

The present controller 50 is configured for determining a state of health (SOH) value of the EPS system 20. As used herein, the term "SOH value" means a numeric value describing the relative health of the EPS system 20 relative to a calibrated, properly functioning standard. The controller 50 is further configured for executing a control action that is appropriate for the determined SOH value, such as by recording a diagnostic code and/or displaying information to a driver of the vehicle 10 via a display 17, e.g., a display screen, indicator lamp, icon, etc.

The vehicle 10 includes a steering wheel 12. The steering wheel 12 rotates in response to driver steering inputs, which are collectively represented in FIG. 1 by double arrow 19. The steering wheel 12 is operatively connected to a steering column 14, which is connected in turn to a steering mechanism 16. In one embodiment, the steering mechanism 16 is a rack and pinion assembly, although other steering assemblies may be used depending on the design. The steering assembly 16 ultimately orients front tires 25 with respect to a road surface 27, e.g., by moving tie rods 18 on a set of front axles (not shown), as is well understood in the art.

A torque sensor 23 and an optional steering angle sensor 21 may be positioned with respect to the steering column 14. The torque sensor 23 measures and transmits a torque sensor signal (arrow 123) to the controller 50. Likewise, the steering angle sensor 21 measures and transmits a steering angle signal (arrow 121) to the controller 50. The controller 50 processes the signals 121, 123 along with additional vehicle operating data (arrow 11), e.g., vehicle velocity, mass, etc., and determines the amount of steering assistance required by a steering motor 32 for executing the present steering maneuver. The controller 50 is in communication with the steering motor 32 via motor control signals (arrow 13). The steering motor 32 responds to the motor control signals (arrow 13) by generating and delivering a motor torque (arrow 15) through a reduction gear set 33 (see FIG. 2) and to the steering mechanism 16.

Still referring to FIG. 1, the controller 50 may transmit the motor control signals (arrow 13) to the steering motor 32 using a controller area network (CAN), serial bus, data router(s), and/or other suitable network connections. Hardware components of the controller 50 may include one or more digital computers each having a microprocessor or central processing unit (CPU), read only memory (ROM), random access memory (RAM), electrically-programmable read only memory (EPROM), a high-speed clock, analog-to-digital (A/D) and digital-to-analog (D/A) circuitry, and input/output circuitry and devices (I/O), as well as appropriate signal conditioning and buffer circuitry.

Each set of algorithms or computer-executable instructions residing within the controller 50 or readily accessible and executable thereby, including any algorithms or computer instructions needed for executing the present method 100 as explained below with reference to FIG. 2, can be stored on tangible, non-transitory computer-readable memory 54 and executed by associated hardware portions of the controller 50 as needed to provide the disclosed functionality. An extended state observer 52 (also see FIG. 4) is included as part of the software functionality of the controller 50, with the state observer 52 applying state space feedback control law, as is well understood in the art. The controller 50 is also programmed with or otherwise has access to a tire dynamics model 56 and an EPS system model 58.

The EPS system model 58 considers the friction of the EPS system 20 and the equivalent inertia and damping of the steering motor 32 and the steering mechanism 16, e.g., a rack and pinion assembly, with this example used hereinafter for illustrative purposes. High friction characteristics in any EPS system are undesirable, as they may adversely affect performance. Due to the high level of torque assist provided by the steering motor 32, the increase in friction may go unnoticed by a driver. In the event of torque assist loss, however, the vehicle 10 will become more difficult to steer.

Friction in the EPS system 20 may be estimated by measuring motor current and angular velocity, and by determining the self-aligning torque (SAT). Because the SAT cannot be measured directly, the present approach instead monitors a deviation of a SAT value obtained from the tire dynamic model 56 in the linear region of the tire lateral force, as explained below with reference to FIG. 3, and from an SAT estimation obtained from the dynamics of the motor 32 and steering mechanism 16 combined using the state observer 52, and assuming nominal parameters of the steering mechanism 16. Progression of the deviation in these differently determined SAT values is then used to indicate the deviation of the friction within the EPS system 20 from a nominal value.

Figure 2:
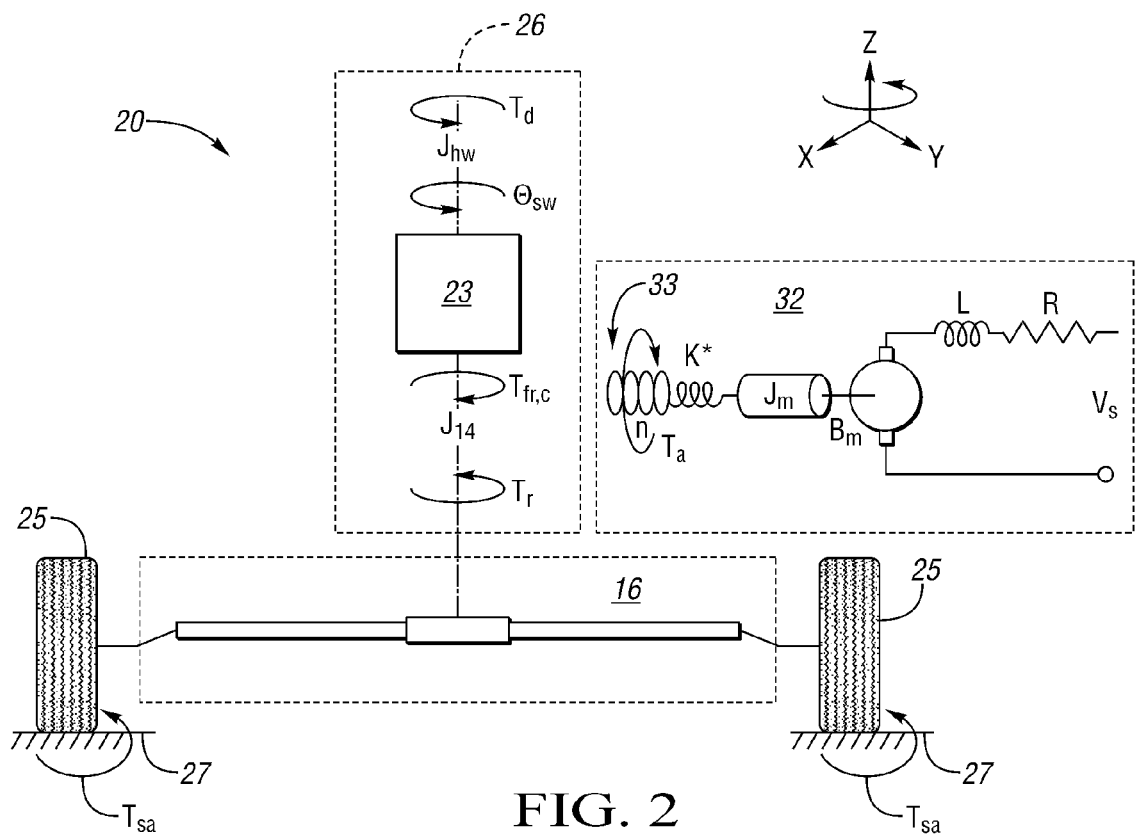
FIG. 2 is a schematic illustration of a modeled steering column-mounted EPS system.

Referring to FIG. 2, the present method 100 provides a fault-based model for a column-type EPS system such as the EPS system 20 of FIG. 1. In such a system, the steering motor 32 is connected to a steering assembly 26, both of which are represented schematically. The steering assembly 26 includes the steering shaft 14 of FIG. 1, the steering wheel 12 of FIG. 1 for receiving a moment ($J_{hw}$), and the sensors 21 and 23 (see FIG. 1), through a reduction gear box 33. The assist torque, which is represented as $T_a$ in FIG. 2, is applied to the steering shaft 14 of FIG. 1 through the reduction gears (not shown). The assist torque ($T_a$) is the product of the motor torque and the gear ratio (n) of the gear box 33, and this torque assists a driver in turning the steering wheel 12. The sum of the driver torque ($T_d$) and the assist torque ($T_a$) rotates the steering shaft 14 against both the self-aligning torque (SAT), as represented in FIG. 2 as arrows $T_{sa}$, from the tires 25 and any friction in the EPS system 20.

The operation of the EPS system 20 of FIGS. 1 and 2 may be expressed by the following equations:

$$J_{sw}\ddot{\theta}_{sw} = T_d - T_{ts} - K_{sw}\theta_{sw} - B_{sw}\dot{\theta}_{sw} - T_{fr,c}$$

where $J_{sw}$, $B_{sw}$, and $K_{sw}$ are the inertial, damping, and stiffness components of the steering wheel 12, respectively, $T_{ts}$ is the output from the torque sensor 23, $T_d$ is the driver torque on the steering wheel 12, $\theta_{sw}$ is the steering angle sensed by the sensor 21 of FIG. 1, and $T_{fr,c}$ is the steering column friction (typically negligible). The torque sensor 23 is modeled herein as a torsion bar having a linear spring and a damping effect, i.e.:

$$T_{ts} = B_{ts}\dot{\theta}_{ts} + K_{ts}\theta_{ts}$$

where $\theta_{ts}$ is the torsion bar deformation of the torque sensor 23 and is equal to:

$$\theta_{ts} = \theta_{sw} - \theta_p$$

where $\theta_p$ is the pinion angle, and is proportional to the angle of the steered wheel, i.e., the angle existing between a projection of the longitudinal axis of the vehicle 10 and the line of intersection of the wheel plane and road surface 27.

The equation of motion of the steering motor 32 can be expressed as:

$$J_m\ddot{\theta}_m + B_m\dot{\theta}_m = T_m$$

$$T_m = K_t i$$

$$L_a \frac{di}{dt} + R_a i = v - K_e \dot{\theta}_m$$

where $J_m$ and $B_m$ are the respective inertia and damping coefficients of the steering motor 32, $T_m$ is the motor torque as noted above, $R_a$ and $L_a$ are the respective resistance and inductance of the steering motor 32, i is the armature current, v is the voltage, and $K_t$ and $K_e$ are the respective torque constant and back EMF, with all values being properties of the steering motor 32.

The controller 50 of FIG. 1 may include a motor control unit which uses proportional integral (PI) control functionality, as is understood in the art. The motor control unit uses the output of any steering control unit portion of the controller 50 as a reference current for the required torque, i.e.:

$$G(s) = \frac{K_p s + K_i}{s}$$

where $K_p$ and $K_i$ are the proportional and integral gains, respectively. The motion of the steering mechanism 16 may be described as a whole rigid body. Therefore, the dynamics of the steering mechanism 16 may be modeled as:

$$J_{eq}\ddot{\theta}_p + B_{eq}\dot{\theta}_p + C_{fr}sgn(\dot{\theta}_p) = T_{ts} + T_a - M_z$$

$$J_{eq} = J_{rp} + n^2 J_m, B_{eq} = B_{rp} + n^2 B_m.$$

where $J_{rp}$ is the inertia of the steering mechanism 16, e.g., a rack and pinion assembly. Likewise, $B_{rp}$ is the damping coefficient, n is the gear ratio of the reduction gear box 33 (see FIG. 1), $C_{fr}$ is the coulomb friction acting on the steering rack of steering assembly 26, $T_a$ is the assist torque (i.e., $nT_m$), and $M_z$ is the SAT.

The torque applied by a driver of vehicle 10, i.e., $T_d$, with assisting torque $T_a$ from the EPS system 20, should overcome two reaction torques when turning the vehicle 10: (1) SAT $M_z$, which is generated by the tires 25 and the road surface 27, and (2) the torque generated by the coulomb friction and viscous friction of the EPS system 20 itself.

Figure 3:
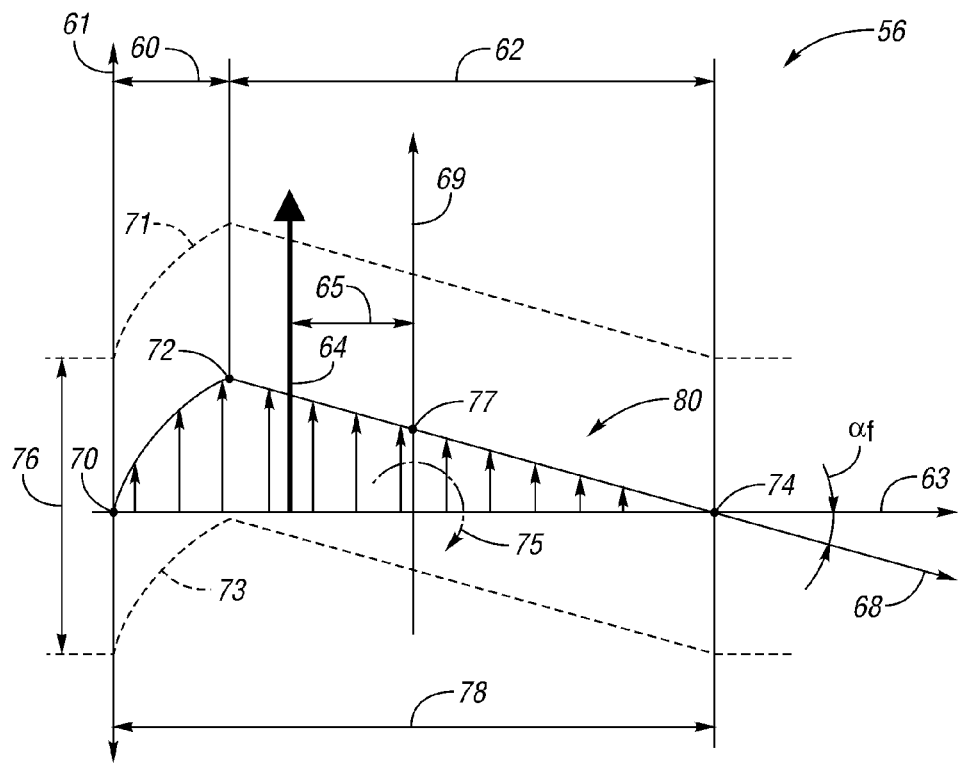
FIG. 3 is a schematic illustration of an example tire dynamics model usable by the present controller.

Referring to FIG. 3, an example of the information contained in the tire dynamics model 56 is shown schematically. The vertical axis 61 represents magnitude, and the horizontal axis 63 represents the direction of travel of the vehicle 10 shown in FIG. 1. Lateral force acting on a given tire 25 is represented by arrow 64, with the tire contact width (arrow 76) represented by the area between traces 71 and 73 in dotted line format. Additional quantities represented in FIG. 4 include the tire slip zone (arrow 60), which lies between points 70 and 72, the tire adhesion area (arrow 62), which lies between points 72 and 74, the pneumatic trail (arrow 65), which is the zone commencing with the lateral force (arrow 64) and ending at point 77, the vehicle heading direction (arrow 68), and tire contact length (arrow 78). Arrow 75 represents the self-aligning torque ($T_{sa}$). The slip angle ($\alpha$) of the front tires 25 lies between the direction of travel (arrow 63) and the heading direction (arrow 68), i.e., the orientation of the tires 25. The linear region of tire dynamics model 56 is indicated generally by arrow 80.

SAT characteristics are explained based on the lateral force distribution of a tire contact patch, which is the portion of tire 25 in contact with the road surface 27, with this portion represented by double arrow 78. The lateral force (arrow 64) builds up in the contact patch to point 72, where the tread shear force overcomes the friction available. This is the adhesion area indicated by double arrow 62. Slip then occurs in the slip area (double arrow 60) when the tire 25 of FIGS. 1 and 2 rotates with a slip angle ($\alpha$).

The asymmetric distribution of force buildup causes the acting point of the lateral force (arrow 64) to be positioned toward the rear of the contact patch by the pneumatic trail (double arrow 65). As understood in the art, the term pneumatic trail refers to the distance from the center of the tire 25 to a point at which the lateral forces are developed. In other words, the asymmetric lateral force distribution caused by the adhesion/slip condition affects the pneumatic trail (double arrow 65). Therefore, the SAT change indicates the adhesion/slip condition in the tire contact patch, since the SAT is equal to the lateral force (arrow 64) multiplied by the pneumatic tail (double arrow 65).

In order to properly estimate road torque, the aligning component first must be estimated. Since the present method 100 works when the tire 25 is in the linear region (arrow 80) of the tire lateral force $F_y$, the slip angle $\alpha$ is proportional to the low frequency aligning component of the road torque $M_z$. Thus:

$$M_{z1} = -L_p F_{xf} F_{xf} = C_f \alpha_f$$

where $L_p$ is the pneumatic trail (arrow 65 of FIG. 4), $C_f$ is the cornering stiffness of the front tires 25, $F_{xf}$ is the front tire lateral force, and $\alpha_f$ is the front tire slip angle. The latter value may be calculated as follows:

$$\alpha_f = -\delta + \frac{v_y + \dot{\psi} a}{v_x}.$$

where $\delta$ is the steering angle of the front wheels, $v_y$ is the lateral velocity of the vehicle at the center of gravity, $v_x$ is the longitudinal velocity of the center of gravity, $\dot{\psi}$ is the yaw rate of the vehicle 10, and $\alpha$ is the distance from the center of gravity of the vehicle 10 to its front axles.

Since fault detection will be active in the linear region (arrow 80 of FIG. 3), the lateral velocity ($\dot{v}_y$) can be calculated as follows:

$$\dot{v}_y = -\frac{C_f + C_r}{m v_x} v_y + \left(\frac{a C_f - b C_r}{m v_x} - v_x\right)\dot{\psi} + \frac{a C_f}{I_z}\delta + g\sin(\gamma)$$

where b is the distance from the center of gravity of the vehicle 10 to the rear axle, $C_r$ is the cornering stiffness of both tires of the rear axle (not shown), g is the acceleration of gravity, $I_z$ is the moment of inertia of the entire vehicle 10 about the yaw axis of the vehicle 10, m is the total vehicle mass, and y is the road bank angle, i.e., the inclination of the road surface 27 of FIG. 2, which may be estimated from information such as lateral acceleration and yaw rate.

From the above equations, the controller 50 can calculate the lateral velocity $v_y$ and thus $M_{z1}$ as follows:

$$v_y = \frac{m}{C_f + C_r}\left(a_y - \frac{aC_f - bC_r}{v_x}\dot{\psi} - \frac{C_f}{m}\delta\right)v_x$$

$$M_{z1} = -K_1 \delta + K_2 a_y - \frac{K_3}{v_x}\dot{\psi}$$

where $K_1 = L_p C_f\left(1 + \frac{C_f}{m}\right)$, $K_2 = \frac{L_p C_f}{C_f + C_r} m$, and $$K_3 = \frac{L_p C_f}{C_f + C_r} m (a C_f - b C_r).$$

Figure 4:
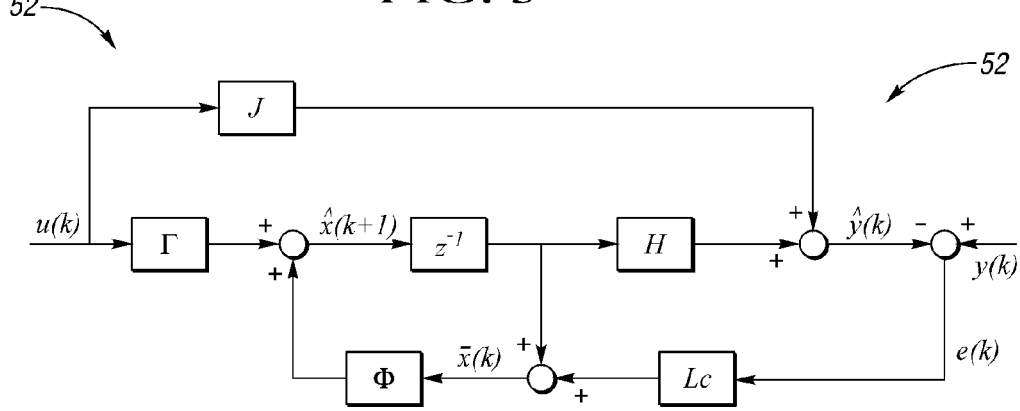
FIG. 4 is a schematic flow diagram for an example extended state observer portion of the controller.

Referring to FIG. 4, a block diagram is shown for one possible embodiment of the state observer 52. The state observer 52 models the EFS system 20 in order to estimate its internal states. State estimation is performed given a set of control inputs (u) and control outputs (y). Thus, a state (x) of a system may be modeled as:

$$x(k+1) = Ax(k) + Bu(k)$$

$$y(k) = Cx(k) + Du(k)$$

where (k) represents time and A, B, C, and D are calibration values. The state observer model may be then derived as:

$$\hat{x}(k+1) = A\hat{x}(k) = L[y(k) - \hat{y}(k)] + Bu(k)$$

$$\hat{y}(k) = C\hat{x}(k) + Du(k)$$

where L in this equation is an estimator gain matrix. The above state equations will be readily understood by those of ordinary skill in the art.

The controller 50 thus estimates the second SAT value ($M_{z2}$) using the EPS system model 58, e.g., the motor/rack and pinion dynamics noted above, and using the extended state observer 52. The SAT estimator functionality is based on the model of the steering mechanism 16 shown in FIG. 2 and discussed above, and may be represented mathematically as follows:

$$\ddot{\theta}_p = g(\theta_p, \dot{\theta}_p, t) + w + bu$$

where $$g(\theta_p, \dot{\theta}_p, t) = -\frac{B_{eq}}{J_{eq}}\dot{\theta}_p - \frac{C_{fr}}{J_{eq}}\text{sgn}(\dot{\theta}_p), w = \frac{T_{ts} - M_z}{J_{eq}},$$

$$b = \frac{K_t n}{J_{eq}}, \text{ and } u = i.$$

In these equations, w represents the external disturbance such as the torque load, i.e., the difference between the torque value (arrow 123 of FIG. 1) measured from the steering torque sensor 23 of FIGS. 1 and 2 and the road torque ($T_r$). Combining the internal dynamics $g(\theta_p, \dot{\theta}_p, t)$ with an external disturbance w, one can form the generalized disturbance $f(\theta_p, \dot{\theta}_p, w, t)$. The above equation is then rewritten as:

$$\ddot{\theta}_p = f(\theta_p, \dot{\theta}_p, w, t) + bu.$$

The controller 50 can then derive an augmented canonical state space model as follows, with reference to FIG. 3:

$$\dot{x} = Ax + Bu + E\dot{f}$$
$$y = Cx + Du$$
$$A = \begin{bmatrix} 0 & 1 & 0 \\ 0 & 0 & 1 \\ 0 & 0 & 0 \end{bmatrix}, B = \begin{bmatrix} 0 \\ b \\ 0 \end{bmatrix}, E = \begin{bmatrix} 0 \\ 0 \\ 1 \end{bmatrix}$$
$$C = [1 \ 0 \ 0], D = [0]$$

where $x = \lfloor \theta_p \ \dot{\theta}_p \ f \rfloor^T$ includes the disturbance to be estimated.

Next, the state space model from state observer 52 is discretized by applying a zero order hold:

$$x(k+1) = \Phi x(k) + \Gamma u(k)$$

$$y(k) = Hx(k) + Ju(k)$$

Using the state observer 52, the following results:

$$\hat{x}(k+1) = \Phi \hat{x}(k) + \Gamma u(k) + L(y(k) - \hat{y}(k))$$

$$\hat{y}(k) = H\hat{x}(k) + Ju(k)$$

By defining $L = \Phi L_c$, the estimate reduces to:

$$\hat{x}(k+1) = \Phi \bar{x}(k) + \Gamma u(k)$$

where the new state is given, i.e., the discrete estimator, by:

$$\bar{x}(k) = \hat{x}(k) + L_c(y(k) - y(k))$$

The SAT estimator gain vector $L_c$ is then determined by placing the poles ($\beta$) of the discrete characteristic equation $\lambda(z)$ as follows:

$$\lambda(z) = |zI - (\Phi - \Phi LH)| = (z-\beta)^3, \beta = e^{-\omega T}$$

Again applying a zero order hold:

$$\Phi = \begin{bmatrix} 1 & T & \frac{T^2}{2} \\ 0 & 1 & T \\ 0 & 0 & 1 \end{bmatrix}, \Gamma = \begin{bmatrix} \frac{bT^2}{2} \\ bT \\ 0 \end{bmatrix}, H = [1 \ 0 \ 0], J = 0, \text{ and}$$

$$L = \begin{bmatrix} 1 - \beta^3 \\ (1-\beta^2)(1+\beta)\frac{3}{2T} \\ (1-\beta)^3 \frac{1}{T^2} \end{bmatrix}$$

where T is the discrete sample time. Thus:

$$M_{z2}(k) = T_{ts} - (J_{eq}\hat{f}(\hat{\theta}_p, \dot{\hat{\theta}}_p, w, t) + B_{eq}\dot{\theta}_p + C_f \text{sign}(\dot{\theta}_p)).$$

Figure 5:
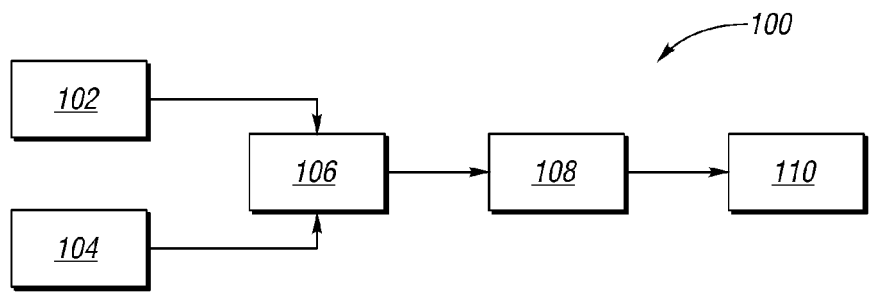
FIG. 5 is a flow chart describing an embodiment of the present method for determining the SOH value for the EPS system shown in FIGS. 1 and 2.

Referring to FIG. 5, the present method 100 provides a fault detection scheme for a column-mounted EPS system 20 shown in FIG. 1, using both electric and mechanical components of the EPS system 20. Using parameter estimation techniques as explained above, the electrical parameters of the steering motor 32, i.e., resistance and back EMF, are determined. The estimated parameters are then compared with the a priori estimated parameters of a "healthy" system to detect faults. The mechanical parameters of the steering motor 32 are diagnosed based on the SAT estimated first from the tire dynamics in the linear region of the tire lateral force, and second from the motor/rack and pinion parameters. The variance of the difference of the SAT obtained via the two approaches indicates the deviation of the mechanical parameters from their nominal value.

An embodiment of method 100 begins at step 102, where the first SAT value ($M_{z1}$) is estimated using the tire dynamics model 56, which includes the modeled dynamics in the linear region of a lateral force acting on the tires 25 as shown in FIG. 3.

Step 104 includes estimating the second SAT value ($Mz_2$) using an extended state observer 52 and nominal parameters for the EPS system 20.

Step 106 includes calculating a variance ($\Delta M_z$) between the first SAT value ($M_{z1}$) and the second SAT value ($M_{z2}$). Steps 102-106 may be repeated in a loop so that the trend or progress of this variance can be later monitored by the controller 50, which executes step 108 after a sufficient number of samples have been recorded for determining the progress of the deviation.

Step 108 includes monitoring a progression of the calculated variance over a calibrated interval using the controller 50 and determining the SOH value for the EPS system 20 using this progression.

Step 110 includes automatically executing a control action using the SOH value. At step 108, the controller 50 determines the fault range for the variance ($\Delta M_z$). The controller 50 may calculate a state of health (SOH) value for the EPS system 20 using the progress of the deviation as determined at step 106. For instance, in a possible SOH prognosis, the following equation may be applied by the controller 50:

$$SOH = 1 - k \left| \frac{\Delta M_z(k)}{M_z(k)} \right|$$

where k in this equation is a tunable gain, and where $0 < k < 1$. Thus, an SOH value of 1 may correspond to a properly performing EPS system 20, while an SOH of 0 may correspond to an imminent failure of the EPS system 20.

At step 110, the controller 50 may execute a suitable control action based on the SOH value recorded at step 108. One possible embodiment of step 110 includes dividing a scale of SOH values into different bands, e.g., "good", "degraded", "worn", and "impending failure". Each band may be assigned a specific range of SOH values, e.g., 1 to 0.75 for "good", etc. Diagnostic codes may be set for the various bands, with the code being recorded for reference by a maintenance technician, or by automated remote detection and reporting if the vehicle 10 is equipped with a telematics unit.

The vehicle 10 may be equipped with the display 17 as noted above. For an impending failure, the user may be alerted by the controller 50 using the display 17, e.g., by displaying a message or icon. The display 17 may be, in a simplified embodiment, a simple instrument panel warning lamp, potentially accompanied by an audible signal sufficiently warning the user of impending failure. Results falling between the extremes of "good" and "impending failure" could be presented via the display 17 or recorded as diagnostic codes, or both, depending on the severity of the SOH value and the progress of the deviation.

While the best modes for carrying out the invention have been described in detail, those familiar with the art to which this invention relates will recognize various alternative designs and embodiments for practicing the invention within the scope of the appended claims.

The invention claimed is:

1. A method for determining a state of health (SOH) value for an electronic power steering (EPS) system in a vehicle having tires and a controller, the method comprising:
   estimating a first Self-Aligning Torque (SAT) value using a tire dynamics model, wherein the tire dynamics model includes modeled dynamics in the linear region of a lateral force acting on the tires;
   estimating a second SAT value using an extended state observer and nominal parameters for the EPS system;
   calculating a variance between the first SAT value and the second SAT value;
   monitoring a progression of the calculated variance over a calibrated interval using the controller to thereby determine the SOH value, wherein the SOH value is a numeric value in a range of between 0 and 1 that describes the progression of the calculated variance; and
   automatically executing a control action using the SOH value.

2. The method of claim 1, wherein the vehicle includes a steering motor and a rack and pinion system, and wherein the nominal parameters describe the dynamics of the motor and the rack and pinion system.

3. The method of claim 1, wherein automatically executing a control action includes at least one of: recording a diagnostic code and displaying an icon or message within the vehicle.

4. The method of claim 1, including displaying the icon or message only when the SOH value is less than a calibrated threshold.

5. The method of claim 1, further comprising dividing the range of between 0 and 1 of SOH values into a plurality of bands, and executing the control action in a different manner for each of the bands relative to the other bands.

6. An electric power steering (EPS) system for a vehicle, comprising:
   a steering wheel configured to receive a set of driver steering inputs, including a steering torque and a steering angle;
   a torque sensor configured to measure the steering torque;
   an angle sensor configured to measure the steering angle;
   a rack and pinion assembly;
   a steering motor operable for passing a variable motor assist torque to the rack and pinion assembly at a torque level which depends in part on the steering angle and the steering torque; and
   a controller having an extended state observer;
   wherein the controller is configured to:
      estimate a first Self-Aligning Torque (SAT) value using a tire dynamics model, wherein the tire dynamics model includes modeled dynamics in the linear region of a lateral force acting on the tires;
      estimate a second SAT value using an extended state observer and nominal parameters for the EPS system;
      calculate a variance between the first SAT value and the second SAT value;
      monitor a progression of the calculated variance over a calibrated interval using the controller to thereby determine the SOH value, wherein the SOH value is a numeric value in range of between 0 and 1 that describes the progression of the calculated variance; and
      automatically execute a control action using the SOH value.

7. The EPS system of claim 6, wherein the controller is configured to automatically execute the control action via at least one of: recording a diagnostic code and displaying an icon or message within the vehicle.

8. The EPS system of claim 6, wherein the controller is further configured to divide the range of between 0 and 1 into a plurality of bands, and to execute the control action in a different manner for each of the bands relative to the other bands.

9. A vehicle comprising:
   a steering wheel;
   tires which are steerable in response to driver inputs received by the steering wheel;
   an electric power steering (EPS) system having a gear set and a steering motor, wherein the EPS system is configured to provide a motor assist torque to the gear set to thereby assist steering of the tires; and
   a controller configured to execute a set of instructions from a tangible/non-transitory memory to thereby:
      estimate a first Self-Aligning Torque (SAT) value using a tire dynamics model, wherein the tire dynamics model includes modeled dynamics in the linear region of a lateral force acting on the tires;
      estimate a second SAT value using an extended state observer and nominal parameters for the EPS system;
      calculate a variance between the first SAT value and the second SAT value;
      monitor a progression of the calculated variance over a calibrated interval using the controller to thereby determine the SOH value, wherein the SOH value is a numeric value in a range of between 0 and 1 that describes the progression of the calculated variance; and
      automatically execute a control action using the SOH value.

10. The vehicle of claim 9, wherein the gear set is a rack and pinion assembly.

11. The vehicle of claim 9, wherein the controller automatically executes the control action by at least one of: recording a diagnostic code and displaying an icon or message within the vehicle.

12. The vehicle of claim 9, wherein the controller is further configured to divide the range of between 0 and 1 into a plurality of bands, and to execute the control action in a different manner for each of the bands relative to the other bands.

* * * * *